United States Patent

Bernard

Patent Number: 5,623,011
Date of Patent: Apr. 22, 1997

[54] TACKIFIED EMULSION PRESSURE-SENSITIVE ADHESIVE

[75] Inventor: Margaret M. Bernard, LaVerne, Calif.

[73] Assignee: Avery Dennison Corporation, Pasadena, Calif.

[21] Appl. No.: 645,693

[22] Filed: May 14, 1996

Related U.S. Application Data

[63] Continuation of Ser. No. 289,418, Aug. 12, 1994, abandoned.

[51] Int. Cl.$^6$ ..................................... C08L 31/02
[52] U.S. Cl. ..................... 524/270; 524/272; 524/395
[58] Field of Search ................................ 524/270, 272, 524/395

[56] References Cited

U.S. PATENT DOCUMENTS

| | | | |
|---|---|---|---|
| 4,418,120 | 11/1983 | Kealy et al. | 428/343 |
| 4,477,613 | 10/1984 | Evans et al. | 524/272 |
| 4,654,389 | 3/1987 | Graham et al. | 524/272 |
| 4,726,982 | 2/1988 | Traynor et al. | 428/213 |
| 4,988,742 | 1/1991 | Moon et al. | 522/79 |
| 5,013,784 | 5/1991 | Yang | 524/458 |
| 5,095,065 | 3/1992 | Yang | 524/458 |
| 5,106,902 | 4/1992 | Yang | 524/458 |
| 5,164,441 | 11/1992 | Yang | 524/458 |
| 5,164,444 | 11/1992 | Bernard | 524/833 |
| 5,179,151 | 1/1993 | Yang | 524/458 |
| 5,189,126 | 2/1993 | Bernard | 526/261 |
| 5,242,963 | 9/1993 | Mao | 524/272 |
| 5,284,891 | 2/1994 | Wouters et al. | 524/522 |

FOREIGN PATENT DOCUMENTS 0303430  2/1989  European Pat. Off. .

*Primary Examiner*—Jeffrey T. Smith
*Attorney, Agent, or Firm*—Christie, Parker & Hale, LLP

[57] ABSTRACT

A tackified pressure-sensitive adhesive having good convertibility and improved adhesive performance even at coat weights lower than conventional systems is provided. The pressure-sensitive adhesive comprises (a) an emulsion polymer formed from a monomer mix comprising 35 to 60% by weight alkyl acrylates, 15 to 35% by weight vinyl esters, 15 to 35% by weight diesters of dicarboxylic acids, and up to about 5% by weight unsaturated carboxylic acids, and (b) a tackifier having an acid number of from about 30 to about 60 and a ring and ball softening point of from about 50° to about 70° C. In one embodiment, the tackifier has a hydrocarbon resin component and a rosin-based resin component, with the preferred tackifier comprising an aromatic modified aliphatic resin containing wood rosin. A preferred adhesive comprises 8 to 12 parts by weight tackifier per 100 parts by weight polymer.

35 Claims, No Drawings

TACKIFIED EMULSION PRESSURE-SENSITIVE ADHESIVE

CROSS-REFERENCE TO RELATED APPLICATION

This is a continuation of application Ser. No. 08/289,418, filed Aug. 12, 1994 now abandoned.

BACKGROUND OF THE INVENTION

The present invention relates to emulsion pressure-sensitive adhesives which, when formulated with suitable tackifiers, provide good convertibility and improved low temperature performance at coat weights lower than the conventional systems used in general purpose label applications.

In general, pressure-sensitive adhesives are provided as solvent polymers, bulk polymers, and emulsion polymers. Some are pressure-sensitive adhesives in their own right, i.e., inherently tacky, while others require tackification to achieve that end. My earlier patents, U.S. Pat. No. 5,164,444, and U.S. Pat. No. 5,189,126 (both of which are incorporated herein by this reference), describe emulsion pressure-sensitive adhesive polymers which exhibit excellent performance at room and low temperature, and good convertibility.

It is known that acrylic-based pressure-sensitive adhesives can be tackified to improve adhesion to non-polar substrates such as polyolefins. However, most of the commercially available tackifiers have low molecular weights, as compared to the adhesive polymer, and their addition to the polymer lowers the shear properties and convertibility characteristics of the adhesive. Such tackified adhesives often exhibit poor adhesion to other substrates, such as recycled corrugated board. Additionally, tackification of pressure-sensitive adhesives typically improves room temperature performance, but not low temperature performance, and, in most cases, the performance of the tackified adhesive is less than that of the non-tackified pressure-sensitive adhesive. Performance characteristics would thus appear to depend in large part on the selection of tackifier(s), their functional groups, and concentrations.

The following patents are illustrative of various known types of tackified pressure-sensitive adhesives:

U.S. Pat. No. 4,418,120 to Kealy, et al. describes a tackified, crosslinked, acrylic adhesive which shows improved adhesion to low energy substrates. The adhesive is based on a solution polymer of isooctyl acrylate and acrylic acid containing from 3–7% by weight of acrylic acid, 100 parts of which is blended with 20–50 parts of a tackifying rosin ester having an acid number less than 20. The adhesive also contains antioxidants and a crosslinking agent, and is coated and dried at 70° C. to allow for crosslinking. The composition is required to be free of surfactants to achieve the designated performance.

U.S. Pat. No. 4,726,982 to Trayner, et al. describes a tackified acrylic pressure-sensitive adhesive for application to high solids automotive paints. The adhesive is a solution polymer of an acrylic acid ester of non-tertiary alcohol containing from 4–14 carbon atoms, which polymers contain from 10–40 parts of N-vinyl lactam, and is tackified with 5–50 parts, based on the weight of the polymer, of tackifying resins such as poly(isobornyl methacrylate), rosin ester, and mixed aliphatic/aromatic polymeric tackifier resins. A combination of the N-vinyl lactam and the tackifier is needed to provide high adhesion to automotive paint. Compositions with less than 10% N-vinyl lactam do not provide high adhesion. The tackifying resins are either esters or hydrocarbon resins with no carboxyl functionality.

U.S. Pat. No. 4,988,742 to Moon, et al. discloses tackified acrylic pressure-sensitive adhesives with improved shear and adhesion to low energy substrates. The adhesives comprise from about 60–95 parts of a photo-polymerized polymer of monomers containing 60–96 parts of an alkyl acrylate, the alkyl groups having an average of 6–12 carbon atoms, from about 2–15 parts of strongly polar monomers, and 2–25 parts of second strongly polar and/or moderately polar monomers; from about 5–40 parts of a hydrogenated rosin ester tackifying agent; and from about 0.01–1 parts of a photoinitiator; wherein such adhesive has a lower glass transition temperature than would an identical untackified acrylic pressure-sensitive adhesive. The tackifying resins disclosed are rosin esters with softening points of 65°–110° C. with an acid number of less than 10.

U.S. Pat. No. 5,284,891 to Wouters et al. describes the use of tackifiers in polyacrylate emulsion pressure-sensitive adhesives. Typical compositions have 35–85% by weight on a dry basis of the polyacrylate emulsion pressure-sensitive adhesive and from 15–70% by weight of a tackifying resin having a softening point of 10°–120° C., the resin being a copolymer of (i) a feed which is predominantly $C_5$ olefins and diolefins, and (ii) 10–60 weight percent of monovinyl aromatic compounds, e.g., styrene. The resins are purely hydrocarbon resins with no acid functionality.

U.S. Pat. No. 5,242,963 to Mao discloses a tackified pressure-sensitive adhesive composition with improved adhesion to low density polyethylene, comprising an aqueous pressure-sensitive adhesive polymer emulsion and a tackifier. The copolymer emulsion consists essentially of 10–25 wt. % vinyl acetate, 10–25 wt. % ethylene, 50–80 wt. % acrylate monomer, and 5–40 wt. % dialkyl maleate or fumarate, and has a glass transition ranging from −70° C. to 15° C. The tackifier resin is a rosin ester, a petroleum resin or a terpene resin, present in an amount of from 5–60 wt. %, and preferably 20–40 wt. %. The patent does not disclose the use of a resin mixture, nor the functional groups present in the resin. The resins used either do not have any carboxyl functionality or have an acid number of less than 20. To see the improvement in performance, the resin needs to be present in an amount of at least 30%, based on solids.

European Patent No. 0 303 430 to Martin describes tackified acrylic pressure-sensitive adhesives and adhesive tapes cured by ultraviolet radiation, with improved peel adhesion to various substrates. The pressure-sensitive adhesives comprise from about 50–95 parts by weight of an ultraviolet radiation-polymerized polymer of one or more monomers which are predominantly alkyl acrylate, the alkyl group of which has an average of 4–12 carbon atoms, and about 0–15 parts by weight of one or more strongly polar copolymerizable monomers, or about 0–30 parts by weight of one or more moderately polar monomers; and about 5–50 parts by weight of one or more tackifying resins, said tackifying resins comprising aliphatic polymeric resins derived from C-5 or (C-5)$_2$ monomer fractions which further contain from about 1 to about 80 weight percent aromatic components derived from C-9 aromatic monomer hydrocarbon fractions. The tackifying resins have a number average molecular weight of about 300–2500, a polydispersity index of less than about 5, a glass transition temperature of about 40°–120° C. and a solubility parameter of about 7–9.5, and said adhesive having a monomer conversion factor of at least about 95%. The resins used are aromatic modified aliphatic polymeric resins.

U.S. Pat. Nos. 5,013,784; 5,106,902; 5,179,151; 5,095,065 and 5,164,441 describe internal resin tackified acrylic polymers containing crosslinkable monomers. The tackified acrylic copolymer compositions comprise a hydrogenated hydrocarbon resin, synthetic or natural, having a molecular weight of from about 500 to about 5000 and an aromatic content of at least 10% by weight; and an acrylic emulsion copolymer comprising from about 1–15 wt. % of a (meth-)acrylic acid, from 0 to about 50 wt. % of a lower alkyl (meth)acrylate ester and from about 25 to about 99 wt. % of an upper alkyl (meth) acrylate ester, having dissolved therein from about 10 to about 100 parts of the resin per 100 parts polymerizable monomer, said polymerizable monomer mixture including an effective amount of about 0.1 to about 2% of a crosslinking monomer. The polymer can also be made free from crosslinking monomer and chain transfer agent.

In general, the presence of a tackifying resin improves adhesion to polyolefin substrates at the cost of reduced adhesion to recycled corrugated board. What is needed is a tackified pressure-sensitive adhesive that performs well on a wide variety of substrates, at both room and low temperatures.

SUMMARY OF THE INVENTION

The present invention provides pressure-sensitive adhesive compositions that exhibit excellent peel and tack adhesion to a wide variety of substrates ranging from polar, relatively high energy surfaces such as glass and stainless steel, to nonpolar, relatively low energy surfaces such as polyolefins, and to difficult to bond surfaces such as corrugated board. Performance at room temperature and low temperature is good in spite of tackification. In adhesive constructions including facestock and liner, the adhesive provides excellent high speed converting characteristics such as die cutting, matrix stripping, and fan folding, equivalent to that of the nontackified systems. The adhesive systems provide good performance in sheet fed laser printer applications, with minimal or no contamination, and are free from edge ooze. Superior properties are obtained even at lower than normal coat weights. In sum, the adhesives are broad-based, and serve to replace many emulsion-based adhesives.

The pressure-sensitive adhesives of the present invention comprise an emulsion pressure-sensitive adhesive polymer and a tackifier having an acid number of from about 30 to about 60 and a softening point of from about 50° to about 70° C., with the tackifier being present in an amount of between about 5 and 25 parts by weight per 100 parts of the polymer. Preferably, the tackifier is present in an amount of between about 8 and 15—and more preferably, about 8 to 12—parts by weight per 100 parts of the polymer.

The pressure-sensitive adhesive polymers used in the present invention are similar to the polymers described in my earlier patents, identified above, but with compositional modification and no crosslinker. The polymers have a glass transition temperature of less than about −30° C. and a gel content of from about 50 to about 70% by weight of the polymer, and comprise, on a polymerized basis and based on the total weight of the polymer, about 35 to about 60% by weight of at least one alkyl acrylate (more preferably, a mixture of alkyl acrylates) containing from about 4 to about 8 carbon atoms in the alkyl group; about 15 to about 35% by weight (more preferably, about 15 to 20% by weight) of at least one vinyl ester containing from about 2 to about 16 carbon atoms in the alkyl chain of the ester; about 15 to about 35% of at least one diester of dicarboxylic acid, wherein each alkyl group of the diester independently contains from about 6 to about 12 carbon atoms; and up to about 5% by weight (more preferably, about 1 to about 3%) of an unsaturated carboxylic acid containing from about 3 to about 5 carbon atoms.

The emulsion polymers are prepared using conventional surfactants or, more preferably, by additionally employing a reactive surfactant which polymerizes and becomes part of the emulsion polymer, and which has been observed to enhance cohesive strength and aid in copolymerization of the monomers in forming the emulsion pressure-sensitive adhesive polymers. The reactive surfactant is employed in an amount up to about 0.5% by weight of the total monomers, preferably from about 0.1 to 0.25% by weight. The preferred reactive surfactants are anionic vinyl functional surfactants, such as sodium vinyl sulfonate and sodium styrene sulfonate.

The emulsion polymers are prepared with excellent conversions at reaction temperature ranging from about 70° to about 85° C., in the presence of from about 0.5 to about 1% by weight, based on the weight of the monomers, of a persulfate or equivalent catalyst, with the monomer mix being fed over a period of about 4 to 5 hours. Reaction pH is from about 2.5 to about 4.0. Conversion is high, approaching 100% at the reaction conditions set forth above.

The tackifiers useful in this invention have an acid number of from about 30 to about 60, preferably 30 to 45, and a ring and ball softening point of from about 50° to about 70° C. In a preferred embodiment, the tackifier comprises two parts, namely, a hydrocarbon resin component, preferably an aromatic modified aliphatic hydrocarbon resin, and a rosin-based resin component, with the two components present in a suitable ratio to provide a desired balance of properties and good adhesion both to polyolefins and recycled corrugated board. Typically, the tackifier is added as an aqueous dispersion. The hydrocarbon resin and rosin-based resin component can be mixed together and dispersed in a single process, or, alternatively, aqueous dispersions of the two components can be blended together in a suitable ratio to obtain the desired acid number and softening point.

The pressure-sensitive adhesives of the present invention are prepared by making an emulsion polymer as described above, adjusting the pH to between about 6 and 7 (preferably by adding ammonia), and adding an aqueous dispersion of the tackifier to the emulsion polymer. When so formulated, the adhesive is ready to be coated on release paper, dried, and laminated to a desired backing.

DETAILED DESCRIPTION

The present invention provides tackified, emulsion pressure-sensitive adhesives which exhibit excellent convertibility and improved low-temperature performance at coat weights lower than conventional systems used in general purpose label applications. The adhesives exhibit excellent peel and tack adhesion to a wide variety of substrates, from polar, relatively high energy substrates such as glass and stainless steel, to non-polar, relatively low energy surfaces such as polyolefins, and to difficult to bond surfaces such a recycled corrugated board. The adhesives exhibit good room temperature performance and, in spite of the presence of a tackifier, good low temperature performance.

As compared to tackified styrene-butadine adhesives, the adhesives of the present invention exhibit better aging and show no edge ooze or bleed as part of a release liner-adhesive-facestock laminate. In adhesive constructions including a facestock and release liner, the adhesives provide excellent high speed label converting characteristics, such as die cutting, matrix stripping and fan folding, equivalent to that of non-tackified systems. The adhesives provide good performance in sheet-fed laser printer applications, with minimal or no contamination, and are free from edge ooze. Surprisingly, superior properties are obtained even at coat weights of about 20 grams per square meter ($g/m^2$), which is significantly lower than coat weights of 23–27 $g/m^2$ commonly used in many general purpose labeling applications.

The adhesives of the present invention contain a pressure-sensitive adhesive polymer essentially similar in composition to the polymers described in the above-referenced U.S. Pat. Nos. 5,164,444 and 5,189,126, and a positive amount of a tackifier having an acid number of between about 30 and about 60 and a softening point of between about 50° and about 70° C. The polymers are prepared by emulsion polymerization, according to the method described in U.S. Pat. No. 5,164,444 (col. 5, lines 27–68). The polymers contain, on a polymerized basis and based on the total weight of the polymer, the following monomers: (i) from about 35 to about 60 percent by weight of at least one alkyl acrylate containing from about 4 to about 8 carbon atoms in the alkyl group; (ii) from about 15 to about 35 percent by weight of at least one vinyl ester containing from 2 to about 16 carbon atoms in the alkyl chain of the ester; (iii) from about 15 to about 35 percent by weight of at least one diester of a dicarboxylic acid, wherein each alkyl group of the diester independently contains from about 6 to about 12 carbon atoms; and (iv) from 0 to about 5 percent by weight of an unsaturated carboxylic acid containing from about 3 to about 5 carbon atoms.

More specifically, the first monomeric component comprises at least one alkyl acrylate, and preferably a mixture of alkyl acrylates, present in a total amount of from about 35 to 60 percent by weight. Useful alkyl acrylates include n-butyl acrylate, 2-ethylhexyl acrylate, isooctyl acrylate and the like. The preferred first monomeric component is a mixture of 2-ethylhexyl acrylate and butyl acrylate.

The second monomeric component comprises vinyl esters present in a total amount of from about 15 to about 35 percent by weight, more preferably from about 15 to about 20 percent by weight, with the vinyl esters containing from 2 to about 16 carbon atoms in the alkyl group of the ester. Suitable vinyl esters include vinyl acetate, vinyl butyrate, vinyl propionate, vinyl isobutyrate, vinyl valerate, vinyl versitate, and the like. Vinyl acetate is preferred.

The third monomeric component of the emulsion polymer comprises one or more diesters of a dicarboxylic acid, wherein each alkyl group of the diester independently contains from about 6 to about 12 carbon atoms, the diesters being present in a total amount of from about 15 to about 35 percent by weight. The preferred diesters are dioctyl esters such as di-2-ethylhexyl maleate, di-2-ethylhexyl fumarate, and mixtures thereof.

The fourth monomeric component of the polymer comprises up to about 5 percent by weight, preferably from about 1 to about 3 percent by weight, of at least one unsaturated carboxylic acid containing from 3 to about 5 carbon atoms. Such unsaturated carboxylic acids include acrylic acid, methacrylic acid, itaconic acid, β-carboxyethyl acrylate, and the like. Acrylic and methacrylic acid are the preferred unsaturated carboxylic acids, with a mixture of the two being more preferred.

Preferably, the emulsion polymers used in the pressure-sensitive adhesives of the present invention are prepared in the presence of a reactive surfactant which polymerizes during formation of the polymer and becomes an integral part of the polymer. Preferred reactive surfactants include anionic vinyl functional monomers such as sodium vinyl sulfonate, sodium styrene sulfonate, and the like. The reactive surfactant is present as part of the total surfactant system in an amount up to about 0.5 percent by weight of the total monomers, preferably about 0.1 to about 0.25 percent by weight.

The presently preferred polymer contains, exclusive of reactive surfactant monomers and on a weight basis, about 48% 2-ethylhexyl acrylate, 27% di-2-ethylhexyl maleate, 19.5% vinyl acetate, 3.35% butyl acrylate, 1.2% acrylic acid, and 0.95% methacrylic acid. When tackified, this polymer yields a pressure-sensitive adhesive which exhibits excellent convertibility and good room and low-temperature performance. It is slightly less expensive to produce than the second presently preferred polymer, which contains, exclusive of reactive surfactant monomers, 51% 2-ethylhexyl acrylate, 26.85% di-2-ethylhexyl maleate, 20% vinyl acetate, 1.15% acrylic acid and 1% methylacrylic acid.

The proportions of monomers are adjusted in such a way that the polymer has a glass transition temperature ($T_g$) less than about −30° C., giving a good balance of adhesion and tack at room and low temperatures.

As explained in U.S. Pat. No. 5,164,444 (col. 4, line 61 through col. 5, line 20), the above-described emulsion polymers have a gel content (% insolubles) in the range of 50 to 70% by weight, which provides good cohesive strength without the use of multifunctional monomers. In this regard, gel represents the amount of polymer which is insoluble in tetrahydrofuran, expressed in % by weight and determined by the membrane gel partitioning method.

In addition to an emulsion polymer, the pressure-sensitive adhesives of the present invention also include a tackifier. Although the emulsion polymers themselves are inherently tacky, by adding a tackifier having an acid number of from about 30 to about 60 and a ring and ball softening point of from about 50° to about 70° C., pressure-sensitive adhesives exhibiting good convertibility and improved room temperature and low temperature performance are obtained, even at coat weights lower than the conventional systems used in general purpose label applications, and for a wide range of substrates, including polar, non-polar, and difficult to bond to surfaces.

More particularly, it has been found that excellent performance characteristics are obtained by adding to the emulsion polymer an aqueous dispersion of a tackifier having an acid number of from about 30 to about 60, preferably from 30 to 45, and a softening point of from about 50° to 70° C. As used herein, the term "acid number" means the number of milligrams of potassium hydroxide required to neutralize the free acids present in one gram of tackifier.

The preferred tackifiers used in this invention contain both a hydrocarbon resin component and a rosin-based resin component. Preferably, the hydrocarbon resin is an aromatic modified aliphatic hydrocarbon resin, with a ring and ball softening point of from about 60° to about 80° C., and having no reactive functional groups. (Pendant phenyl groups and the like are not considered "reactive" in this context.) This range of softening points has been found to be optimal for the pressure-sensitive adhesive polymer compositions described above. At higher softening points, the adhesive properties can deteriorate, while at lower softening points, tackifier migration can occur.

Useful hydrocarbon resins include Tacolyn 1070, an aromatic-modified, aliphatic hydrocarbon resin sold by Hercules Incorporated ("Hercules"); XR-3013, an experimental resin from Arizona Chemicals; and similar resins.

The rosin-based resin component of the tackifier is a rosin or rosin derivative which, when blended with the hydrocarbon resin, yields the desired acid number and softening point. Such rosin-based resin components include wood rosins, gum rosins, tall oil rosins, fully or partially polymerized rosins, disproportionated rosins, fully or partially hydrogenated rosins, fully or partially esterified rosins, and other modified and/or stabilized rosins and the like. A preferred rosin is wood rosin, which is primarily abietic acid, with an acid number of from about 155 to about 210. Commercially available high-acid tackifiers include Snowtack 301A, 342A, 385G, 348A, and the like, sold by Eka Nobel.

A two component tackifier containing a hydrocarbon resin and a rosin-based resin component can be prepared by mixing a rosin-based resin dispersion with a hydrocarbon resin dispersion, or vice versa, in a suitable ratio such that the resulting tackifier has an acid number of between about 30 and 60 (preferably, from 30 to about 45) and a softening point of between about 50° and 70° C. in order to provide an adhesive which exhibits good adhesion both to substrates such as polyolefins and recycled corrugated board. Presently, the preferred tackifier is ResA 2467, an experimental product developed with Hercules and which is an aromatic modified aliphatic resin containing rosin acid, with an acid number of from 30 to 45 and a softening point of from 55° to 65° C. Hercules makes the tackifier in a single process.

The tackifier is added to the emulsion polymer in a positive amount of up to about 25 parts by weight (dry tackifier) per 100 parts of the polymer (dry weight), with about 5 to 15 parts tackifier per 100 parts polymer being preferred, and 8 to 12 parts per 100 parts polymer being more preferred. Presently, the most preferred adhesive formulation contains about 8 to 10 parts by weight of ResA 2467 per 100 parts of the emulsion polymer. A good balance of adhesive properties and, surprisingly, converting properties equivalent to or better than untackified adhesives, is seen with this and similar formulations. Although some prior systems reveal tackifier resin levels of between 5 and 50%, the working examples actually require greater than about 20% tackifier to see improved performance.

The pressure-sensitive adhesives of the present invention are preferably formulated by first preparing an emulsion polymer as described above, adjusting its pH to between about 6 and 7 (preferably by addition of ammonia, with agitation), and adding an aqueous dispersion of the tackifier. Adhesive constructions are then prepared as follows: The formulated adhesive is coated on a release liner at about 20 to 21 g/m² coat weight, dried at 70° to 90° C. for about 10 to 15 minutes, and laminated to a paper (or other) backing, preferably, electronic data processing paper (EDP), data systems processing paper (DSX), high gloss, and/or dual print paper. Other facestocks such as polymeric film can also be used.

EXAMPLES 1–21C

To a one liter reactor equipped with a reflux condenser, a thermocouple, a pitched turbine agitator and a nitrogen inlet tube, there was charged a solution containing 78 g of deionized water, 4 g of sodium vinyl sulfonate (25% by weight solution in water) and 0.38 g of Polystep B-27, an anionic surfactant manufactured and sold by Stepan Chemicals. A monomer mix consisting of 240 g of 2-ethylhexyl acrylate (2-EHA), 145 g of di-2-ethylhexyl maleate (DOM), 105 g of vinyl acetate (VAc), 6.25 g of acrylic acid (AA), and 5 g of methacrylic acid (MAA) was added to 125 g of water containing 44.5 g of Polystep B-27, and 6.5 g of Polystep F-9 (manufactured and sold by Stepan Chemicals) and agitated to make a pre-emulsion. The reactor charge was heated to 72° to 75° C. and there was added 21 g of 4.45% w/w of potassium persulfate solution. 66 g of the pre-emulsified monomer and 10.4 g of the potassium persulfate were added over a 20–30 minute period. After the temperature reached a steady state, the remaining monomer pre-emulsion and a 1.85% aqueous solution of potassium persulfate buffered with sodium bicarbonate were introduced into the reactor at respective rates of 2.22 and 0.287 g/minute, over a period of 270 minutes. The reaction temperature was maintained between 79° C. and 82° C. After the end of feed, the temperature was raised to 83°–85° C. Thirty minutes after the feed, 5.25 g of a 4.8% solution of potassium persulfate was added and the reactants maintained at a temperature of 87°–90° C. for 90 minutes. Once the polymerization was complete, the contents were cooled to ambient temperature, neutralized with ammonia to pH 5–7 and discharged. The polymer content was 59.2% solids with less than 0.02% coagulum. Polymer $T_g$ was −33° C. 10.15 g of an aqueous dispersion of Tacolyn 1070 resin was slowly added, with agitation, to 100 g of the above-described emulsion polymer, and the formulation was stirred for 20 to 30 minutes.

Using the above-described procedures, the tackified adhesives and untackified comparative pressure-sensitive adhesive polymers listed in Table 1 (Examples 1–21C) were prepared. Control 1 ("Ctl. 1") is an inherently tacky emulsion acrylic copolymer pressure-sensitive adhesive prepared in accordance with U.S. Pat. No. 5,164,444, and is commercially available from Avery-Dennison. Control 2 ("Ctl. 2") is a different emulsion arcylic copolymer pressure-sensitive adhesive available from Avery-Dennison, to which was added Snow Tack 301A as a tackifier.

TABLE 1

| | Monomeric Composition (Wt. %) | | | | | | | Tackifier | | | |
|---|---|---|---|---|---|---|---|---|---|---|---|
| Sample | 2-EHA[1] | DOM[2] | VAC[3] | BA[4] | AA[5] | MAA[6] | % Solids[7] | Tackifier | % Tackifier | Softening Pt. (°C.) | Acid No. |
| Ex. 1 | 48 | 29 | 21 | 0 | 1.25 | 1 | 59.2 | Tac. 1070[8] | 10 | 70 | — |
| Ex. 2 | 52.5 | 27 | 18 | 0 | 1.5 | 1 | 60.2 | Tac. 1070 | 10 | 70 | — |
| Ex. 3 | 35 | 25 | 21 | 16.5 | 1.5 | 1 | 59.3 | Tac. 1070 | 10 | 70 | — |
| Ex. 4 | 48 | 23 | 18 | 8.7 | 1.5 | 0.8 | 59.4 | — | — | — | — |
| Ex. 4A | 48 | 23 | 18 | 8.7 | 1.5 | 0.8 | | ResA 2430[9] | 15 | 60 | — |
| Ex. 4B | 48 | 23 | 18 | 8.7 | 1.5 | 0.8 | | 11558-48[10] | 12.5 | 63 | 42 |

TABLE 1-continued

| | Monomeric Composition (Wt. %) | | | | | | | Tackifier | | | |
|---|---|---|---|---|---|---|---|---|---|---|---|
| Sample | 2-EHA[1] | DOM[2] | VAC[3] | BA[4] | AA[5] | MAA[6] | % Solids[7] | Tackifier | % Tackifier | Softening Pt. (°C.) | Acid No. |
| Ex. 5 | 49.7 | 23 | 16 | 9 | 1.5 | 0.8 | 60 | — | — | — | — |
| Ex. 5A | 49.7 | 23 | 16 | 9 | 1.5 | 0.8 | | ResA 2430 | 12.5 | 60 | — |
| Ex. 5B | 49.7 | 23 | 16 | 9 | 1.5 | 0.8 | | 11558-48 | 12.5 | 63 | 42 |
| Ex. 6 | 49 | 23 | 17 | 8.85 | 1.25 | 0.9 | 59.6 | — | — | — | — |
| Ex. 6A | 49 | 23 | 17 | 8.85 | 1.25 | 0.9 | | 11558-48 | 12.5 | 63 | 42 |
| Ex. 7 | 50 | 24 | 17 | 6.8 | 1.3 | 0.9 | 59.9 | — | — | — | — |
| Ex. 7A | 50 | 24 | 17 | 6.8 | 1.3 | 0.9 | | 11558-48 | 15 | 63 | 42 |
| Ex. 7B | 50 | 24 | 17 | 6.8 | 1.3 | 0.9 | | 11558-76[11] | 13 | 60 | — |
| Ex. 8 | 48 | 25.05 | 18 | 6.85 | 1.1 | 1 | 59.1 | — | — | — | — |
| Ex. 8A | 48 | 25.05 | 18 | 6.85 | 1.1 | 1 | | Tac. 1070 | 12.5 | 70 | — |
| Ex. 8B | 48 | 25.05 | 18 | 6.85 | 1.1 | 1 | | 11558-84[12] | 8 | 63 | 42 |
| Ex. 9 | 48 | 25 | 18 | 6.85 | 1.2 | 0.95 | 59.35 | — | — | — | — |
| Ex. 9A | 48 | 25 | 18 | 6.85 | 1.2 | 0.95 | | 11558-96[13] | 8 | 61 | 39 |
| Ex. 9B | 48 | 25 | 18 | 6.85 | 1.2 | 0.95 | | 11558-84 | 8 | 63 | 42 |
| Ex. 9C | 48 | 25 | 18 | 6.85 | 1.2 | 0.95 | | 11568-10[14] | 8 | NA | 42 |
| Ex. 10 | 50 | 26.45 | 19 | 2.4 | 1.2 | 0.95 | 59.8 | — | — | — | — |
| Ex. 10A | 50 | 26.45 | 19 | 2.4 | 1.2 | 0.95 | | 11558-76 | 12.5 | 60 | — |
| Ex. 10B | 50 | 26.45 | 19 | 2.4 | 1.2 | 0.95 | | ResA 2430 | 10 | 60 | — |
| Ex. 11 | 50 | 26.45 | 19 | 2.4 | 1.25 | 0.9 | 59.8 | — | — | — | — |
| Ex. 11A | 50 | 26.45 | 19 | 2.4 | 1.25 | 0.9 | | 11558-76 | 12.5 | 60 | — |
| Ex. 11B | 50 | 26.45 | 19 | 2.4 | 1.25 | 0.9 | | 11558-84 | 8 | 63 | 42 |
| Ex. 11C | 50 | 26.45 | 19 | 2.4 | 1.25 | 0.9 | | ResA 2430 | 8 | 60 | — |
| Ex. 12 | 51 | 26.9 | 20 | — | 1.3 | 0.8 | 59.6 | — | — | — | — |
| Ex. 12A | 51 | 26.9 | 20 | — | 1.3 | 0.8 | | 11558-76 | 13.5 | 60 | — |
| Ex. 12B | 51 | 26.9 | 20 | — | 1.3 | 0.8 | | ResA 2430 | 10 | 60 | — |
| Ex. 12C | 51 | 26.9 | 20 | — | 1.3 | 0.8 | | 11558-84 | 8 | 63 | 42 |
| Ex. 12D | 51 | 26.9 | 20 | — | 1.36 | 0.8 | | 11558-96 | 8 | 61 | 39 |
| Ex. 13 | 51 | 26.85 | 20 | — | 1.15 | 1 | 59.58 | — | — | — | — |
| Ex. 13A | 51 | 26.85 | 20 | — | 1.15 | 1 | | ResA 2430 | 10 | 60 | — |
| Ex. 13B | 51 | 26.85 | 20 | — | 1.15 | 1 | | 11558-84 | 10 | 63 | 42 |
| Ex. 13C | 51 | 26.85 | 20 | — | 1.15 | 1 | | 11558-96 | 8 | 61 | 39 |
| Ex. 14 | 51 | 26.9 | 20 | — | 1.2 | 0.9 | 59.39 | — | — | — | — |
| Ex. 14A | 51 | 26.9 | 20 | — | 1.2 | 0.9 | | Tac. 1070 | 12.5 | 70 | — |
| Ex. 14B | 51 | 26.9 | 20 | — | 1.2 | 0.9 | | ResA 2430 | 12.5 | 60 | — |
| Ex. 14C | 51 | 26.9 | 20 | — | 1.2 | 0.9 | | 11558-84 | 12.5 | 63 | 42 |
| Ex. 15 | 48 | 25 | 18 | 6.85 | 1.25 | 0.9 | 59.5 | — | — | — | — |
| Ex. 15A | 48 | 25 | 18 | 6.85 | 1.25 | 0.9 | | 11558-84 | 12.5 | 63 | 42 |
| Ex. 15B | 48 | 25 | 18 | 6.85 | 1.25 | 0.9 | | 11558-84 | 10 | 63 | 42 |
| Ex. 16 | 48 | 25 | 18 | 6.85 | 1.25 | 0.9 | 58.63 | — | — | — | — |
| Ex. 16A | 48 | 25 | 18 | 6.85 | 1.25 | 0.9 | | ResA 2430 | 8 | 60 | — |
| Ex. 16B | 48 | 25 | 18 | 6.85 | 1.25 | 0.9 | | 11558-84 | 8 | 63 | 42 |
| Ex. 16C | 48 | 25 | 18 | 6.85 | 1.25 | 0.9 | | Tac. 1070 | 8 | 70 | — |
| Ex. 17 | 48 | 28.85 | 21 | — | 1.2 | 0.95 | 59.56 | — | — | — | — |
| Ex. 17A | 48 | 28.85 | 21 | — | 1.2 | 0.95 | | 11558-84 | 8 | 63 | 42 |
| Ex. 17B | 48 | 28.85 | 21 | — | 1.2 | 0.95 | | 11558-84 | 10 | 63 | 42 |
| Ex. 18 | 48 | 27 | 19.5 | 3.35 | 1.2 | 0.95 | 59.4 | — | — | — | — |
| Ex. 18A | 48 | 27 | 19.5 | 3.35 | 1.2 | 0.95 | | 11558-84 | 10 | 63 | 42 |
| Ex. 18B | 48 | 27 | 19.5 | 3.35 | 1.2 | 0.95 | | ResA 2430 | 10 | 60 | — |
| Ex. 18C | 48 | 27 | 19.5 | 3.35 | 1.2 | 0.95 | | 11558-84 | 8 | 63 | 42 |
| Ex. 18D | 48 | 27 | 19.5 | 3.35 | 1.2 | 0.95 | | ResA 2430 | 8 | 60 | — |
| Ex. 18E | 48 | 27 | 19.5 | 3.35 | 1.2 | 0.95 | | 11575-20[15] | 8 | 70 | 38 |
| Ex. 18F | 48 | 27 | 19.5 | 3.35 | 1.2 | 0.95 | | 11575-33[16] | 8 | 65 | 34 |
| Ex. 18G | 48 | 27 | 19.5 | 3.35 | 1.2 | 0.95 | | 11575-34[17] | 8 | 67 | 38 |
| Ex. 18H | 48 | 27 | 19.5 | 3.35 | 1.2 | 0.95 | | 11575-49[18] | 8 | 61 | 36.5 |
| Ex. 18I | 48 | 27 | 19.5 | 3.35 | 1.2 | 0.95 | | DM462010G[19] | 8 | 62 | 10 |
| Ex. 18J | 48 | 27 | 19.5 | 3.35 | 1.2 | 0.95 | | DM461044G[20] | 8 | 62 | 44 |
| Ex. 18K | 48 | 27 | 19.5 | 3.35 | 1.2 | 0.95 | | 11575-70[21] | 8 | 56 | 45 |
| Ex. 18L | 48 | 27 | 19.5 | 3.35 | 1.2 | 0.95 | | SnowT 301A[22] | 8 | 64 | 120 |
| Ex. 18M | 48 | 27 | 19.5 | 3.35 | 1.2 | 0.95 | | ResA 2467[23] | 8 | 63 | 32 |
| Ex. 18N | 48 | 27 | 19.5 | 3.35 | 1.2 | 0.95 | | XR-3013[24] | 8 | 80 | — |
| Ex. 19 | 48 | 25 | 18 | 6.9 | 1.15 | 0.95 | 59.8 | — | — | — | — |
| Ex. 19A | 48 | 25 | 18 | 6.9 | 1.15 | 0.95 | | 11558-84 | 10 | 63 | 42 |
| Ex. 20 | 51 | 26.4 | 19.3 | 1.5 MM | 1.03 | 0.775 | 59.9 | — | — | — | — |
| Ex. 20A | 51 | 26.4 | 19.3 | 1.5 MM | 1.03 | 0.775 | | 11558-84 | 8 | 63 | 42 |
| Ex. 20B | 51 | 26.4 | 19.3 | 1.5 MM | 1.03 | 0.775 | | 11558-96 | 8 | 61 | 39 |
| Ex. 21 | 49 | 25.5 | 19 | 4.35 | 1.2 | 0.95 | 59.89 | — | — | — | — |
| Ex. 21A | 49 | 25.5 | 19 | 4.35 | 1.2 | 0.95 | | ResA 2441[25] | 8 | NA | 42 |
| Ex. 21B | 49 | 25.5 | 19 | 4.35 | 1.2 | 0.95 | | ResA 2430 | 8 | 60 | — |
| Ex. 21C | 49 | 25.5 | 19 | 4.35 | 1.2 | 0.95 | | ResA 2438[26] | 8 | NA | 42 |
| Ctl. 1 | | | | see text | | | | — | — | — | — |
| Ctl. 2 | | | | see text | | | | SnowT 301A | 25–30 | 64 | 120 |

[1]2-ethylhexyl acrylate
[2]di-2-ethylhexyl maleate

TABLE 1-continued

| | Monomeric Composition (Wt. %) | | | | | | % | Tackifier | | | |
|---|---|---|---|---|---|---|---|---|---|---|---|
| Sample | 2-EHA[1] | DOM[2] | VAC[3] | BA[4] | AA[5] | MAA[6] | Solids[7] | Tackifier | % Tackifier | Softening Pt. (°C.) | Acid No. |

[3] vinyl acetate
[4] butyl acrylate
[5] acrylic acid
[6] methacrylic acid
[7] percent solids in untackified polymer. Tackified samples typically differ by about ± 2% from the untackified base polymer
[8] Tacolyn 1070, manufactured and sold by Hercules
[9] Lab made aromatic modified aliphatic resin, made by Hercules
[10] Lab made experimental product containing Tacolyn 1070 and wood rosin, made by Hercules
[11] See note 9
[12] See note 10
[13] See note 10
[14] See note 10
[15] Lab made mixed resin dispersion containing gum rosin, made by Hercules
[16] Lab made mixed resin dispersion containing wood rosin, with KOH used as a neutralizing agent, made by Hercules
[17] Lab made mixed resin dispersion containing both wood rosin and gum rosin, made by Hercules
[18] See note 15
[19] Lab made experimental resin made by Eka Nobel
[20] See note 19
[21] Physical blend of wood rosin dispersion and Tacolyn 1070 dispersion, made by Hercules
[22] Snow Tack 301A, a high acid rosin ester dispersion made by Eka Nobel
[23] Production scale-up batch of the lab made resin described in note 10
[24] Experimental aromatic modified aliphatic hydrocarbon resin made by Arizona Chemicals
[25] 10 gallon scale-up of lab made resin described in note 10, with surfactant variation, made by Hercules
[26] 10 gallon scale-up of lab made resin described in note 10, made by Hercules
NA = not available Table 2 compares the adhesive performance of Examples 1–21 and Controls 1 and 2 at room temperature. As indicated, the tackified adhesives of the present invention provide significantly better performance than the existing commercial products and the untackified base pressure-sensitive adhesive polymers, even at lower coat weights. Consequently, the adhesives of the present invention are less expensive to use than the commercially available products. The effect of adhesive coat weight on adhesive performance is seen by comparing Examples 18 and 18', which are identical, untackified emulsion pressure-sensitive adhesives, but which were applied using coat weights of 21 and 23 g/m², respectively.

TABLE 2

| | Coat | 90° Peel Initial lbs/inch | | | Loop Tack Initial lbs/inch | | | RTS[3] (min.) |
|---|---|---|---|---|---|---|---|---|
| Sample | Wt. (g/m²) | Glass | HDPE[1] | RCB[2] | Glass | HDPE | RCB | SS[4] |
| Ex. 1 | 19 | 2.1 | 1.4 | 1 | 4.1 | 2.1 | 1.6 | 80c |
| Ex. 2 | 19 | 1.7 | 1.2 | 1 | 3.5 | 2.5 | 1.1 | 137c |
| Ex. 3 | 19 | 2.2 | 1.3 | 1.1 | 3.8 | 2.1 | 1.7 | 90c |
| Ex. 4 | 19 | 1.76 | 1.15 | 1.15 | 3.74 | 1.9 | 1.82 | 186c |
| Ex. 4A | 20.6 | 2.43 | 1.06 | 1.84 | 3.8 | 2.05 | 1.9 | 69c |
| Ex. 4B | 20.6 | 2.47 | 1.08 | 1.72 | 4.4 | 2.46 | 1.65 | 65c |
| Ex. 5 | NA | NA | 0.66 | 1.72 | NA | 1.57 | 1.75 | 50c |
| Ex. 5A | NA | 1.7 | 0.84 | 1.6 | 3.28 | 1.9 | 1.8 | 31c |
| Ex. 5B | NA | 1.96 | 1.03 | 1.62 | 3.4 | 2.05 | 2.1 | 28c |
| Ex. 6 | 20.4 | 1.75 | 0.78 | 1.46 | 3.04 | 1.65 | 1.07 | 31c |
| Ex. 6A | 21 | 2.49 | 1.12 | 1.6 | | 2.23 | 2.05 | 30c |
| Ex. 7 | 21 | 2.13 | 0.82 | 1.63 | 2.4 | 1.74 | 1.58 | 38c |
| Ex. 7A | 21 | 2.35 | 1.06 | 1.44c | 3 | 2.05 | 1.66 | 25c |
| Ex. 7B | 20.4 | 2.07 | 0.83 | 1.42p/c | 3 | 1.45 | 0.56 | 28c |
| Ex. 8 | 20.2 | 2.02p/c | 0.81 | 0.94p/c | 2.82 | 1.44 | 1.07 | 32c |
| Ex. 8A | 20.2 | 2.27c | 0.72 | 1.6p/c | 2.1 | 1.87 | 1.74 | 17c |
| Ex. 8B | 19.8 | 2.56 | 1.23 | 1.34 | 3.5 | 2.15 | 2.25 | 23c |
| Ex. 9 | 20.4 | 2.33 | 0.94 | 2 | 3.2 | 1.62 | 1.8 | 65c |
| Ex. 9A | 19.8 | 2.4 | 1.37 | 1.62 | 3.76 | 2.2 | 2.4 | 21c |
| Ex. 9B | 19.8 | 2.8 | 1.43 | 1.72 | 4.1 | 2.12 | 2.18 | 26c |
| Ex. 9C | 19.8 | 2.24 | 1.3 | 1.5 | 3.71 | 1.94 | 1.96 | 26c |
| Ex. 10 | 21 | 2.25 | 0.96 | 1.7 | 3.13 | 2.15 | 2.3 | 52c |
| Ex. 10A | 20.4 | 2.5 | 0.89 | 1.7 | 3.16 | 1.9 | 1.6 | 32c |
| Ex. 10B | 20.6 | 2.11 | 1.13 | 1.4 | 3.35 | 2.2 | 1.6 | 38c |
| Ex. 11 | 19.4 | 2.2 | 0.84 | 1.4 | 2.46 | 1.83 | 2.03 | 51c |
| Ex. 11A | 19.8 | 2.22 | 1.01 | 1.53 | 2.65 | 1.83 | 1.09 | 41c |
| Ex. 11B | 20.4 | 2.56 | 1.35 | 1.64 | 3.91 | 2.25 | 2.28 | 31c |
| Ex. 11C | 20.4 | 2.33 | 1.1 | 1.31 | 3 | 2 | 1.55 | 35c |
| Ex. 12 | 20.2 | 2.06 | 0.95 | 1.45 | 3.75 | 1.95 | 2.5 | 90c |
| Ex. 12A | 20.5 | 1.94 | 0.91 | 1.4 | 3.42 | 1.93 | 1.6 | 46c |
| Ex. 12B | 20.6 | 2.2 | 1.26 | 1.67 | 4.13 | 2.06 | 1.81 | 43c |

TABLE 2-continued

| Sample | Coat Wt. (g/m²) | 90° Peel Initial lbs/inch Glass | HDPE[1] | RCB[2] | Loop Tack Initial lbs/inch Glass | HDPE | RCB | RTS[3] (min.) SS[4] |
|---|---|---|---|---|---|---|---|---|
| Ex. 12C | 20.6 | 2.62 | 1.4 | 1.42 | 3.9 | 2.6 | 2.1 | 42c |
| Ex. 12D | 20.4 | 2.5 | 1.41 | 1.6 | 4.31 | 2.3 | 2.1 | 36c |
| Ex. 13 | NA | 1.9 | 0.95 | 1.4 | 3.75 | 1.75 | 0.44 | NA |
| Ex. 13A | 20.2 | 1.92 | 1.14 | 1.4 | 3.7 | 2.11 | 1.5 | 35c |
| Ex. 13B | 20.8 | 2.73 | 1.3 | 1.6 | 4.13 | 2.15 | 2.08 | 25c |
| Ex. 13C | 20.4 | 2.7 | 1.5 | 1.74 | 4.4 | 2.4 | 1.93 | 31c |
| Ex. 14 | 20.2 | 2 | 0.9 | 1.64 | 3.75 | 1.5 | 1.31 | 60c |
| Ex. 14A | NA | 2 | 0.91 | 1.5 | 3.36 | 2 | 0.98 | NA |
| Ex. 14B | NA | 2 | 0.97 | 1.61c | 3.2 | 2 | 0.98 | NA |
| Ex. 14C | NA | 2.24 | 1.07 | 1.4 | 3.4 | 1.9 | 1.9 | NA |
| Ex. 15 | NA | 1.75 | 0.95 | 1.71 | 2.91 | 1.9 | 1.54 | NA |
| Ex. 15A | NA | 2.03 | 1.1 | 1.51 | 3.51 | 2.1 | 1.24 | NA |
| Ex. 15B | 20.6 | 2.44 | 1.25 | 1.81 | 3.4 | 2.4 | 2.03 | 17c |
| Ex. 16A | 20.4 | 2.11 | 1.11 | 1.44 | 3.3 | 2.11 | 1.65 | 42c |
| Ex. 16B | 20.2 | 2.6 | 1.37 | 1.4 | 3.5 | 2.07 | 1.74 | 30c |
| Ex. 16C | 19.8 | 2.4 | 1.23 | 1.1 | 3.03 | 2.07 | 1.93 | 50c |
| Ex. 17 | 20.2 | 1.9 | 0.99 | 0.83 | 3.32 | 2 | 2.1 | 60c |
| Ex. 17A | 20.4 | 2.6 | 1.15 | 2.08 | 4.12 | 2.4 | 2.33 | 31c |
| Ex. 17B | 20 | 2.4 | 1.07 | 1.64 | 4 | 2.1 | 1.84 | 29c |
| Ex. 18 | 20.9 | 1.98 | 1.1 | 1.3 | 3.5 | 1.97 | 1.6 | 138c |
| Ex. 18' | 23.1 | 2.06 | 1.2 | 1.5 | 4.4 | 2.1 | 2.3 | 125c |
| Ex. 18A | 20.6 | 2.44 | 1.25 | 1.81 | 3.7 | 2.2 | 2.55 | 22c |
| Ex. 18B | 20.4 | 2.1 | 1.2 | 1.45 | 3.71 | 1.85 | 1.72 | NA |
| Ex. 18C | 20.4 | 2.5 | 1.5 | 1.82 | 4.2 | 2.2 | 2.13 | 35c |
| Ex. 18D | 20.6 | 2.1 | 1.34 | 1.45 | 3.75 | 2.2 | 1.64 | 44c |
| Ex. 18E | 21 | 2.36 | 1.26 | 0.8 | 4.61 | 3.15 | 1.2 | 53c |
| Ex. 18F | 20 | 2.92 | 1.22 | 1.05 | 4.4 | 2.51 | 1.21 | 51c |
| Ex. 18G | 20–21 | 2.6 | 1.32 | 0.64 | 4.8 | 2.4 | 1.35 | 38c |
| Ex. 18H | 21 | 2.06 | 1.12 | 0.8 | 4.59 | 3.36 | 1.11 | 43c |
| Ex. 18I | 21 | 2.25 | 1.26 | 1.28 | 4.42 | 2.54 | 1.87 | 54c |
| Ex. 18J | 21 | 2.3 | 1.31 | 1.5 | 4.94 | 2.7 | 2.33 | 53c |
| Ex. 18K | 21 | 2.46 | 1.26 | 1.6 | 4.5 | 2.4 | 2.2 | 56c |
| Ex. 18L | 20.8 | 2.4 | 1.2 | 1.1 | 4.53 | 2.4 | 2.17 | 70c |
| Ex. 18M | 20.8 | 2.44 | 1.4 | 1.4 | 4.5 | 2.8 | 2.4 | 53c |
| Ex. 18N | 21 | 2.7 | 1.3 | 1.2 | 5.1 | 2.7 | 2 | 47c |
| Ex. 19 | 20.6 | 1.65 | 1.03 | 1.4 | 3.25 | 2.05 | 1.8 | 60c |
| Ex. 19A | 20.8 | 2.5 | 1.2 | 1.9 | 3.5 | 2.36 | 2.3 | 22c |
| Ex. 20A | 20 | 2.6 | 1.42 | 1.76 | 4.25 | 2.4 | 1.9 | 37c |
| Ex. 20B | 20.6 | 2.75 | 1.2 | 1.5 | 4.16 | 2.5 | 2.15 | 57c |
| Ex. 21 | 21 | 1.97 | 1.07 | 1 | 3.8 | 2.22 | 1.88 | 120c |
| Ex. 21A | 20.6 | 1.9 | 1.3 | 1.28 | 3.75 | 2.33 | 1.73 | 72c |
| Ex. 21B | 20.6 | 1.9 | 1.2 | 1.14 | 3.8 | 2.4 | 1.65 | 74c |
| Ex. 21C | 20.6 | 2.2 | 1.4 | 1.45 | 4.2 | 2.35 | 2 | 63c |
| Ctl. 1 | 23 | 2 | 1.3 | 1.4 | 4.8 | 2.6 | 1.9 | 116c |
| Ctl. 2 | 19–20 | 1.83 | 1.1 | 1 | 3.7 | 2.17 | 1.2 | 22c |

[1]HDPE = High density polyethylene
[2]RCB = Recycled corrugated board. All peel measurements on RCB showed slight to moderate fiber pick, unless otherwise noted
[3]RTS = Room temperature shear (PSTC No. 7, 6th Ed. (500 g load)
[4]SS = Stainless steel
c = Cohesive failure
p/c = panel cohesive failure Table 3 shows the low temperature (25° F.) performance of several examples of the pressure-sensitive adhesives of the present invention compared to the commercially available product, Control 1, the tackified commercial product of Control 2, and three untackified base polymers, Examples 4, 12 and 13. Except where noted, each sample was adhered to glass, high density polyethylene, and recycled corrugated board surfaces, and hand peel from each surface was separately tested three times. The adhesives of the present invention provide better performance than the commercial products and the untackified base polymers.

TABLE 3

| | 25° F. Hand Peel[1] | | | | | | | | |
|---|---|---|---|---|---|---|---|---|---|
| | Glass[2] | | | HDPE[3] | | | RCB[4] | | |
| Sample | #1 | #2 | #3 | #1 | #2 | #3 | #1 | #2 | #3 |
| Ex. 1 | 2 | 2 | — | 1 | 2 | — | 2 | 2 | — |
| Ex. 2 | 2 | 3 | — | 2 | 2 | — | 2 | 2 | — |
| Ex. 3 | 1 | 1 | — | 1 | 1 | — | 1 | 2 | — |
| Ex. 4 | 2 | 3 | 3 | 2 | 2 | 2 | 3 | 3 | 3 |
| Ex. 6A | 2 | 2 | 3 | 2 | 2 | 2 | 2 | 2 | 2 |
| Ex. 7A | 2 | 2 | 2 | 2 | 2 | 2 | 2 | 2 | 3 |
| Ex. 9C | 2 | 2 | 3 | 2 | 2 | 2 | 2 | 2 | 3 |
| Ex. 12 | 2 | 2 | 3 | 2 | 2 | 2 | 2 | 2 | 2 |
| Ex. 12B | 1 | 1 | 1 | 1 | 1 | 1 | 2 | 2 | 2 |
| Ex. 12C | 1 | 1 | 1 | 1 | 2 | 2 | 3 | 2 | 2 |
| Ex. 12D | 2 | 2 | 2 | 2 | 1 | 1 | 3 | 2 | 2 |

TABLE 3-continued

| | 25° F. Hand Peel[1] | | | | | | | | |
|---|---|---|---|---|---|---|---|---|---|
| | Glass[2] | | | HDPE[3] | | | RCB[4] | | |
| Sample | #1 | #2 | #3 | #1 | #2 | #3 | #1 | #2 | #3 |
| Ex. 13 | 2 | 2 | 2 | 2 | 2 | 2 | 2 | 2 | 2 |
| Ex. 13B | 2 | 2 | 2 | 1 | 2 | 1 | 2 | 2 | 2 |
| Ex. 13C | 3 | 3 | 3 | 2 | 2 | 2 | 3 | 2 | 3 |
| Ex. 15B | 2 | 2 | 2 | 2 | 2 | 2 | 2 | 2 | 2 |
| Ex. 16B | 3 | 2 | 3 | 2 | 2 | 2 | 3 | 2 | 3 |
| Ex. 17A | 1 | 2 | 2 | 1 | 1 | 1 | 4 | 2 | 2 |
| Ex. 18A | 2 | 2 | 2 | 1 | 2 | 1 | 2 | 2 | 2 |
| Ex. 18C | 2 | 3 | 2 | 2 | 2 | 2 | 5 | 5 | 5 |
| Ex. 18D | 2 | 2 | 2 | 2 | 2 | 2 | 2 | 2 | 5 |
| Ex. 18N | 3 | 3 | 3 | 1 | 1 | 1 | 1 | 2 | 2 |
| Ex. 19A | 3 | 2 | 2 | 2 | 2 | 2 | 3 | 3 | 2 |
| Ex. 20A | 1 | 1 | 1 | 1 | 1 | 1 | 2 | 2 | 2 |
| Ex. 20B | 2 | 1 | 1 | 1 | 1 | 1 | 2 | 2 | 2 |
| Control 1 | 2 | 2 | 1 | 1 | 2 | 1 | 2 | 2 | 3 |
| Control 2 | 3 | 4 | — | 2 | 2 | 2 | 2 | 2 | 3 |

[1]Subjective hand peel adhesion is expressed as follows: 1 = light adhesion; 2 = moderate adhesion; 3 = tight adhesion; 4 = very tight adhesion; and 5 = facestock/substrate tear.
[2]Removal of each sample from a glass panel was "clean" in all cases except the following: Control 2 - slight tear.
[3]HDPE = highly density polyethylene. Removal of the sample was "zippy" in all cases.
[4]RCB = recycled corrugated board. "Fiber pick" was observed in all cases, except Ex. 12C - slight tear.

In sheet fed laser printer applications, by feeding the adhesive construction sheets (8*12 size) at a rate of 133 sheets per minute, the adhesives of the present invention show fewer spots (20 to 40) per page than the existing commercial product (Control 1), which shows 60 spots per page. In normal practice, the converting speeds at which most known tackified acrylic pressure-sensitive adhesives perform well are lower than that of the corresponding untackified adhesives. Surprisingly, the adhesives of the present invention exhibit convertibility characteristics better than tackified commercial adhesives, and equivalent to or better than untackified adhesives. Table 4 shows the convertibility characteristics of the adhesives of the present invention. Pressure-sensitive adhesive constructions were prepared using DSX paper as a facestock and a 50# FS release liner.

TABLE 4

Convertibility Characteristics[1]

A) Comco Press: max speed of 500 feet per minute

| Sample | DIE-X | DIE-V | AV. Speed |
|---|---|---|---|
| Ex. 1 | 500 | 500 | 500 |
| Ex. 2 | 500 | 500 | 500 |
| Ex. 3 | 500 | 500 | 500 |
| Control 1 | 500 | 450 | 475 |
| Control 2 | 420 | 300 | 360 |

B) Mark Andy Press: DIE-X

| Sample | Av. Speed | Flags[2] | Hangers[3] |
|---|---|---|---|
| Ex. 18C | 875 | 840 | 920 |
| Ex. 18M | 825 | 840 | 870 |
| Control 1 | 800 | 840 | 860 |

[1]Values indicate press speed in feet per minute.
[2]Values denote the press speed (ft./min) at which "flags" first appear, i.e., speed at which the matrix between two labels breaks on one end (but is still removed with the rest of the matrix) during the converting process TABLE 4-continued Convertibility Characteristics[1]

[3]Values denote the press speed (ft./min) at which "hangers" first appear, i.e., the speed at which the matrix between two labels breaks on both ends (and is not removed with the rest of the matrix, but stays on the web) during the converting process

What is claimed is:
1. A pressure-sensitive adhesive, comprising:
   (a) a pressure-sensitive adhesive polymer formed by emulsion polymerization of a monomer mixture comprising, on a polymerized basis and based on the total weight of the monomers:
      (i) from about 35 to about 60% by weight of at least one alkyl acrylate containing from about 4 to about 8 carbon atoms in the alkyl group,
      (ii) from about 15 to about 35% by weight of at least one vinyl ester containing from 2 to about 16 carbon atoms in the alkyl chain of the ester,
      (iii) from about 15 to about 35% by weight of at least one diester of a dicarboxylic acid, wherein each alkyl group of the diester independently contains from about 6 to about 12 carbon atoms, and
      (iv) from 0 to about 5% by weight of at least one unsaturated carboxylic acid containing from about 3 to about 5 carbon atoms,
   said polymer having a glass transition temperature of less than about −30° C. and gel content of from about 50 to about 70% by weight of the polymer; and
   (b) a tackifier having an acid number of from about 30 to about 60 and a ring and ball softening point of from about 50° to about 70° C.

2. A pressure-sensitive adhesive as recited in claim 1, wherein the tackifier comprises an aromatic modified aliphatic resin containing wood rosin.

3. A pressure-sensitive adhesive as recited in claim 1, wherein the tackifier is present in an amount of from about 5 to about 25 parts (dry weight) per 100 parts (dry weight) of the pressure-sensitive adhesive polymer.

4. A pressure-sensitive adhesive as recited in claim 1, wherein the tackifier is present in an amount of from about 8 to about 12 parts (dry weight) per 100 parts (dry weight) of the pressure-sensitive adhesive polymer.

5. A pressure-sensitive adhesive, comprising:
   (a) a pressure-sensitive adhesive polymer formed by emulsion polymerization of a monomer mixture comprising, on a polymerized basis and based on the total weight of the monomers:
      (i) from about 35 to about 60% by weight of at least one alkyl acrylate containing from about 4 to about 8 carbon atoms in the alkyl group,
      (ii) from about 15 to about 35% by weight of at least one vinyl ester containing from 2 to about 16 carbon atoms in the alkyl chain of the ester,
      (iii) from about 15 to about 35% by weight of at least one diester of a dicarboxylic acid, wherein each alkyl group of the diester independently contains from about 6 to about 12 carbon atoms, and
      (iv) from 0 to about 5% by weight of at least one unsaturated carboxylic acid containing from about 3 to about 5 carbon atoms,
   said polymer having a glass transition temperature of less than about −30° C. and gel content of from about 50 to about 70% by weight of the polymer; and
   (b) a tackifier comprising:
      (i) a hydrocarbon resin component, and (ii) a rosin-based resin component, said tackifier having an acid number of from about 30 to about 60 and a ring and ball softening point of from about 50° to about 70° C.

6. A pressure-sensitive adhesive as recited in claim 1, wherein the hydrocarbon resin component comprises an aromatic modified aliphatic resin having a softening point of from about 60° to about 80° C.

7. A pressure-sensitive adhesive as recited in claim 1, wherein the rosin-based resin component has an acid number of from about 100 to about 210 and a softening point of from about 40° to about 90° C.

8. A pressure-sensitive adhesive as recited in claim 5, wherein the tackifier has an acid number of from about 30 to about 45.

9. A pressure-sensitive adhesive as recited in claim 5, wherein the rosin-based resin component is selected from the group consisting of wood rosins, gum rosins, tall oil rosins, polymerized rosins, disproportionated rosins, hydrogenated rosins, partially esterified rosins, and mixtures thereof.

10. A pressure-sensitive adhesive as recited in claim 5, wherein the rosin-based resin component comprises a wood rosin having an acid number of from about 155 to 210.

11. A pressure-sensitive adhesive as recited in claim 5, wherein the tackifier is present in an amount of from about 5 to about 25 parts (dry weight) per 100 parts (dry weight) of the pressure-sensitive adhesive polymer.

12. A pressure-sensitive adhesive as recited in claim 5, wherein the tackifier is present in an amount of from about 8 to about 15 parts (dry weight) per 100 parts (dry weight) of the pressure-sensitive adhesive polymer.

13. A pressure-sensitive adhesive as recited in claim 5, wherein the tackifier is present in an amount of from about 8 to about 12 parts (dry weight) per 100 parts (dry weight) of the pressure-sensitive adhesive polymer.

14. A pressure-sensitive adhesive as recited in claim 5, wherein the tackifier comprises an aromatic modified aliphatic hydrocarbon resin and a rosin acid, said tackifier having an acid number from about 30 to about 45 and a softening point of from about 50° to about 70° C., and is present in an amount of from about 8 to about 12 parts (dry weight) per 100 parts (dry weight) of the pressure-sensitive adhesive polymer.

15. A pressure-sensitive adhesive as recited in claim 5, wherein the alkyl acrylate comprises a mixture of 2-ethylhexyl acrylate and butyl acrylate.

16. A pressure-sensitive adhesive as recited in claim 5, wherein the vinyl ester comprises vinyl acetate.

17. A pressure-sensitive adhesive as recited in claim 5, wherein the vinyl ester is present in an amount of from about 15 to about 20% by weight, based on the total weight of monomers.

18. A pressure-sensitive adhesive as recited in claim 5, wherein the diester of a dicarboxylic acid is selected from the group consisting of di-2-ethylhexyl maleate, di-2-ethylhexyl fumarate, and mixtures thereof.

19. A pressure-sensitive adhesive as recited in claim 5, wherein the unsaturated carboxylic acid is selected from the group consisting of acrylic acid, methacrylic acid, itaconic acid, β-carboxyethyl acrylate, and mixtures thereof.

20. A pressure-sensitive adhesive as recited in claim 5, wherein the unsaturated carboxylic acid is present in an amount of from about 1 to about 3% by weight, based on the total weight of monomers.

21. A pressure-sensitive adhesive as recited in claim 5, wherein the monomer mixture comprises about 48% by weight of 2-ethylhexyl acrylate, about 27% by weight of di-2-ethylhexyl maleate, about 20% by weight of vinyl acetate, about 3% by weight of butyl acrylate, about 1% by weight of acrylic acid and about 1% by weight methacrylic acid.

22. A pressure-sensitive adhesive as recited in claim 5, wherein the monomer mixture comprises about 51% by weight 2-ethylhexyl acrylate, about 27% by weight di-2-ethylhexyl maleate, about 20% by weight vinyl acetate, about 1% by weight acrylic acid and about 1% by weight methacrylic acid.

23. A pressure-sensitive adhesive as recited in claim 5, wherein the monomer mixture further comprises up to about 0.5% by weight of a reactive surfactant, based on the total weight of monomers.

24. A pressure-sensitive adhesive as recited in claim 23, wherein the reactive surfactant is present in an amount of from about 0.1 to about 0.25% by weight, based on the total weight of monomers.

25. A pressure-sensitive adhesive as recited in claim 23, wherein the reactive surfactant comprises an anionic vinyl functional monomer.

26. A pressure-sensitive adhesive as recited in claim 25, wherein the reactive surfactant is selected from the group consisting of sodium vinyl sulfonate and sodium styrene sulfonate.

27. A pressure-sensitive adhesive, comprising:
(a) a pressure-sensitive adhesive polymer formed by emulsion polymerization of a monomer mixture comprising, on a polymerized basis and based on the total weight of the monomers:
  (i) from about 35 to about 60% by weight of at least one alkyl acrylate containing from about 4 to about 8 carbon atoms in the alkyl group,
  (ii) from about 15 to about 35% by weight of at least one vinyl ester containing from 2 to about 16 carbon atoms in the alkyl chain of the ester,
  (iii) from about 15 to about 35% by weight of at least one diester of a dicarboxylic acid, wherein each alkyl group of the diester independently contains from about 6 to about 12 carbon atoms, and
  (iv) from 0 to about 5% by weight of at least one unsaturated carboxylic acid containing from about 3 to about 5 carbon atoms,
said polymer having a glass transition temperature of less than about −30° C. and a gel content of from about 50 to about 70% by weight of the polymer; and
(b) a tackifier present in an amount from about 5 to about 25 parts (dry weight) per 100 parts (dry weight) of the pressure-sensitive adhesive polymer, said tackifier having an acid number of from about 30 to about 60 and a softening point of from about 50° to about 70° C.

28. A pressure-sensitive adhesive as recited in claim 27, wherein the tackifier comprises a hydrocarbon resin component and a rosin-based resin component.

29. A pressure-sensitive adhesive as recited in claim 28, wherein the hydrocarbon resin component comprises an aromatic modified aliphatic hydrocarbon resin.

30. A pressure-sensitive adhesive as recited in claim 28, wherein the hydrocarbon resin component has a ring and ball softening point of from about 60° to about 80° C.

31. A pressure-sensitive adhesive as recited in claim 28, wherein the rosin-based resin component is selected from the group consisting of wood rosins, gum rosins, tall oil rosins, polymerized rosins, disproportionated rosins, hydrogenated rosins, esterified rosins, and mixtures thereof.

32. A pressure-sensitive adhesive as recited in claim 28, wherein the rosin-based resin component has an acid number of from about 100 to about 210 and a softening point of from about 40° to about 90° C.

33. A pressure-sensitive adhesive, comprising:
(a) a pressure-sensitive adhesive polymer formed by emulsion polymerization of a monomer mixture comprising, on a polymerized basis and based on the total weight of the monomers:
   (i) from about 35 to about 60% by weight of at least one alkyl acrylate containing from about 4 to about 8 carbon atoms in the alkyl group,
   (ii) from about 15 to about 35% by weight of at least one vinyl ester containing from 2 to about 16 carbon atoms in the alkyl chain of the ester,
   (iii) from about 15 to about 35% by weight of at least one diester of a dicarboxylic acid, wherein each alkyl group of the diester independently contains from about 6 to about 12 carbon atoms, and
   (iv) from 0 to about 5% by weight of at least one unsaturated carboxylic acid containing from about 3 to about 5 carbon atoms,
said polymer having a glass transition temperature of less than about −30° C. and a gel content of from about 50 to about 70% by weight of the polymer; and
(b) a tackifier comprising:
   (i) a hydrocarbon resin component, and
   (ii) a rosin-based resin component,
said tackifier having an acid number of from about 30 to about 60 and a ring and ball softening point of from about 50° to about 70° C.;
wherein, when coated on a release liner and laminated to a flexible backing, the pressure-sensitive adhesive exhibits adhesion to both polyolefins and recycled corrugated board substrates.

34. A pressure-sensitive adhesive, comprising:
(a) a pressure-sensitive adhesive polymer formed by emulsion polymerization of a monomer mixture comprising, on a polymerized basis and based on the total weight of the monomers:
   (i) from about 35 to about 60% by weight of at least one alkyl acrylate containing from about 4 to about 8 carbon atoms in the alkyl group,
   (ii) from about 15 to about 35% by weight of at least one vinyl ester containing from 2 to about 16 carbon atoms in the alkyl chain of the ester,
   (iii) from about 15 to about 35% by weight of at least one diester of a dicarboxylic acid, wherein each alkyl group of the diester independently contains from about 6 to about 12 carbon atoms, and
   (iv) from 0 to about 5% by weight of at least one unsaturated carboxylic acid containing from about 3 to about 5 carbon atoms,
said polymer having a glass transition temperature of less than about −30° C. and a gel content of from about 50 to about 70% by weight of the polymer; and
(b) a tackifier comprising:
   (i) a hydrocarbon resin component, and
   (ii) a rosin-based resin component,
said tackifier having an acid number of from about 30 to about 60 and a ring and ball softening point of from about 50° to about 70° C.;
wherein, when coated on a release liner to a coat weight of about 20 g/m$^2$ and laminated to a flexible backing, the pressure-sensitive adhesive exhibits a 90° peel of greater than about 1 lb/in. from both HDPE and recycled corrugated board substrates.

35. A pressure-sensitive adhesive, comprising:
(a) a pressure-sensitive adhesive polymer formed by emulsion polymerization of a monomer mixture comprising, on a polymerized basis and based on the total weight of the monomers:
   (i) from about 35 to about 60% by weight of at least one alkyl acrylate containing from about 4 to about 8 carbon atoms in the alkyl group,
   (ii) from about 15 to about 35% by weight of at least one vinyl ester containing from 2 to about 16 carbon atoms in the alkyl chain of the ester,
   (iii) from about 15 to about 35% by weight of at least one diester of a dicarboxylic acid, wherein each alkyl group of the diester independently contains from about 6 to about 12 carbon atoms, and
   (iv) from 0 to about 5% by weight of at least one unsaturated carboxylic acid containing from about 3 to about 5 carbon atoms,
said polymer having a glass transition temperature of less than about −30° C. and a gel content of from about 50 to about 70% by weight of the polymer; and
(b) a tackifier comprising:
   (i) a hydrocarbon resin component, and
   (ii) a rosin-based resin component,
said tackifier being present in an amount of from about 5 to about 25 parts (dry weight) per 100 parts (dry weight) of the polymer and having an acid number of from about 30 to about 60 and a ring and ball softening point of from about 50° to about 70° C.

* * * * *